No. 850,867. PATENTED APR. 16, 1907.
R. H. F. FINLAY.
BATTERY OF ELECTROLYTIC CELLS.
APPLICATION FILED FEB. 12, 1907.
4 SHEETS—SHEET 1.
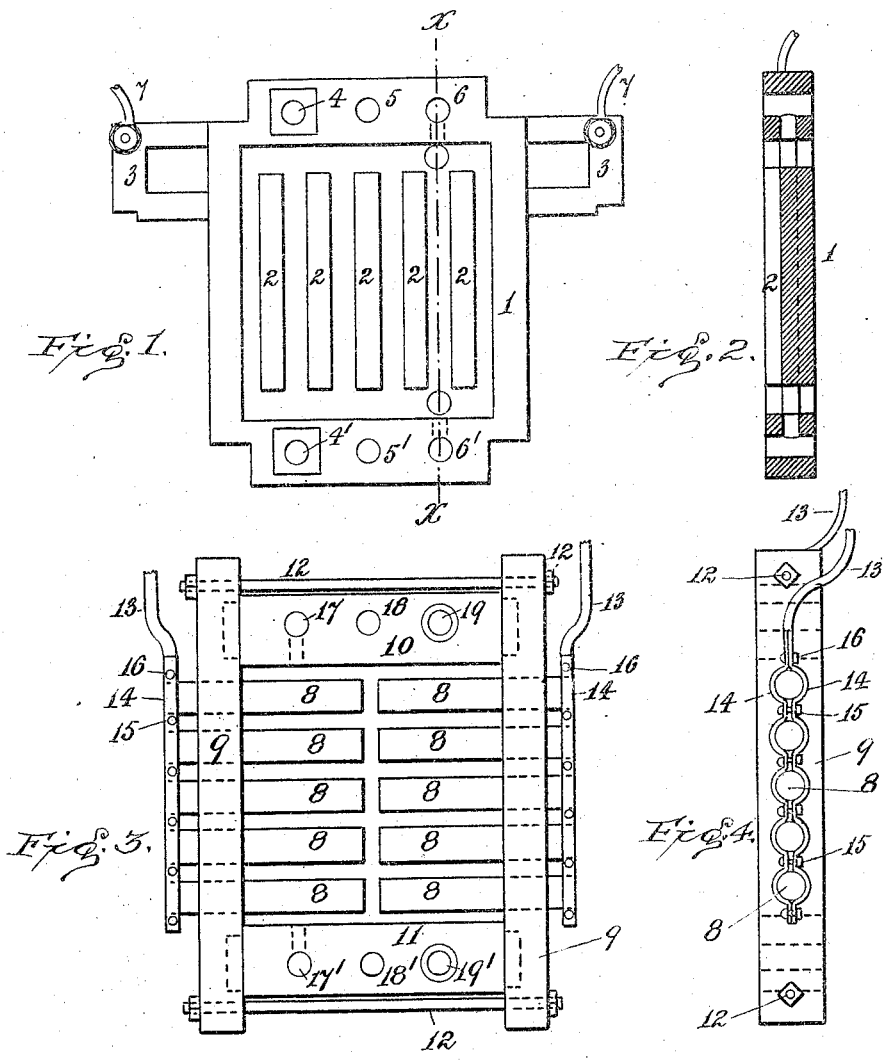
Witnesses—
Inventor—
Robert Hugh Forsythe Finlay
By: Edson Bros,
Attorneys

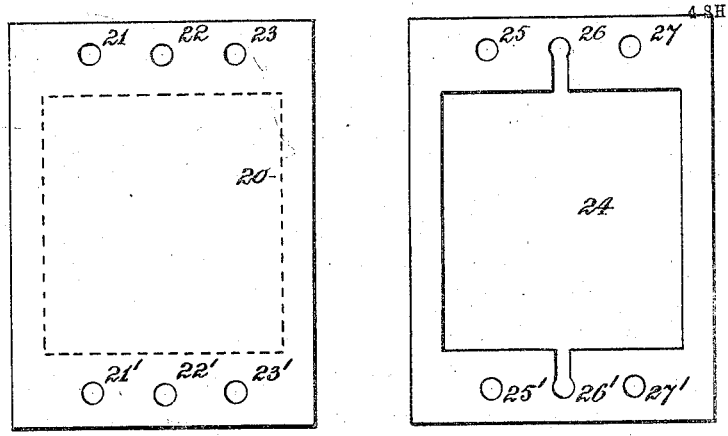
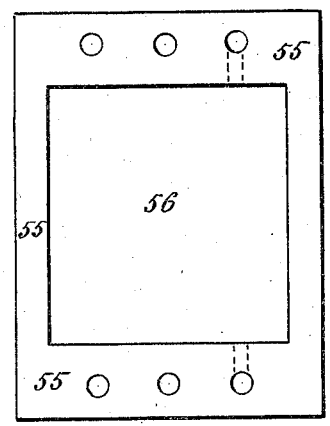
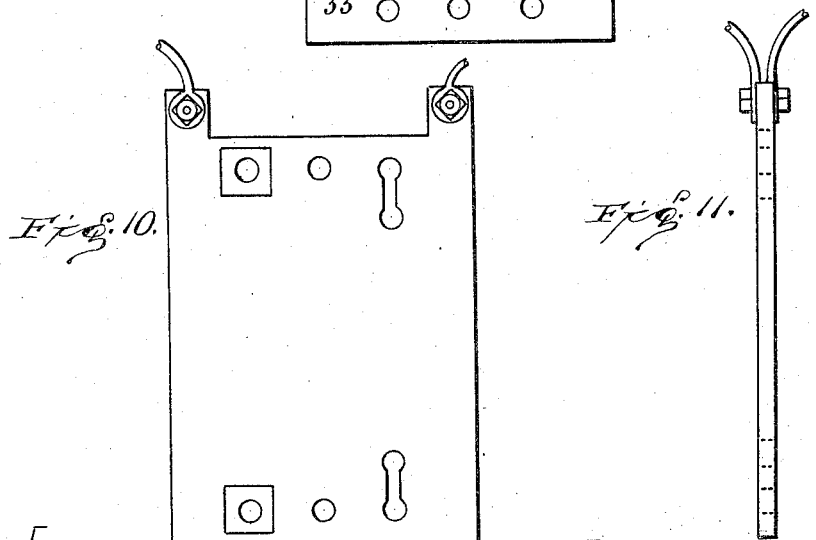

No. 850,867. PATENTED APR. 16, 1907.
R. H. F. FINLAY.
BATTERY OF ELECTROLYTIC CELLS.
APPLICATION FILED FEB. 12, 1907.

Witnesses—
H. J. Veihmeyer,
W. F. Small,

Inventor—
Robert Hugh Forsythe Finlay
By: Edson Bros,
Attorneys

No. 850,867. PATENTED APR. 16, 1907.
R. H. F. FINLAY.
BATTERY OF ELECTROLYTIC CELLS.
APPLICATION FILED FEB. 12, 1907.
4 SHEETS—SHEET 4.
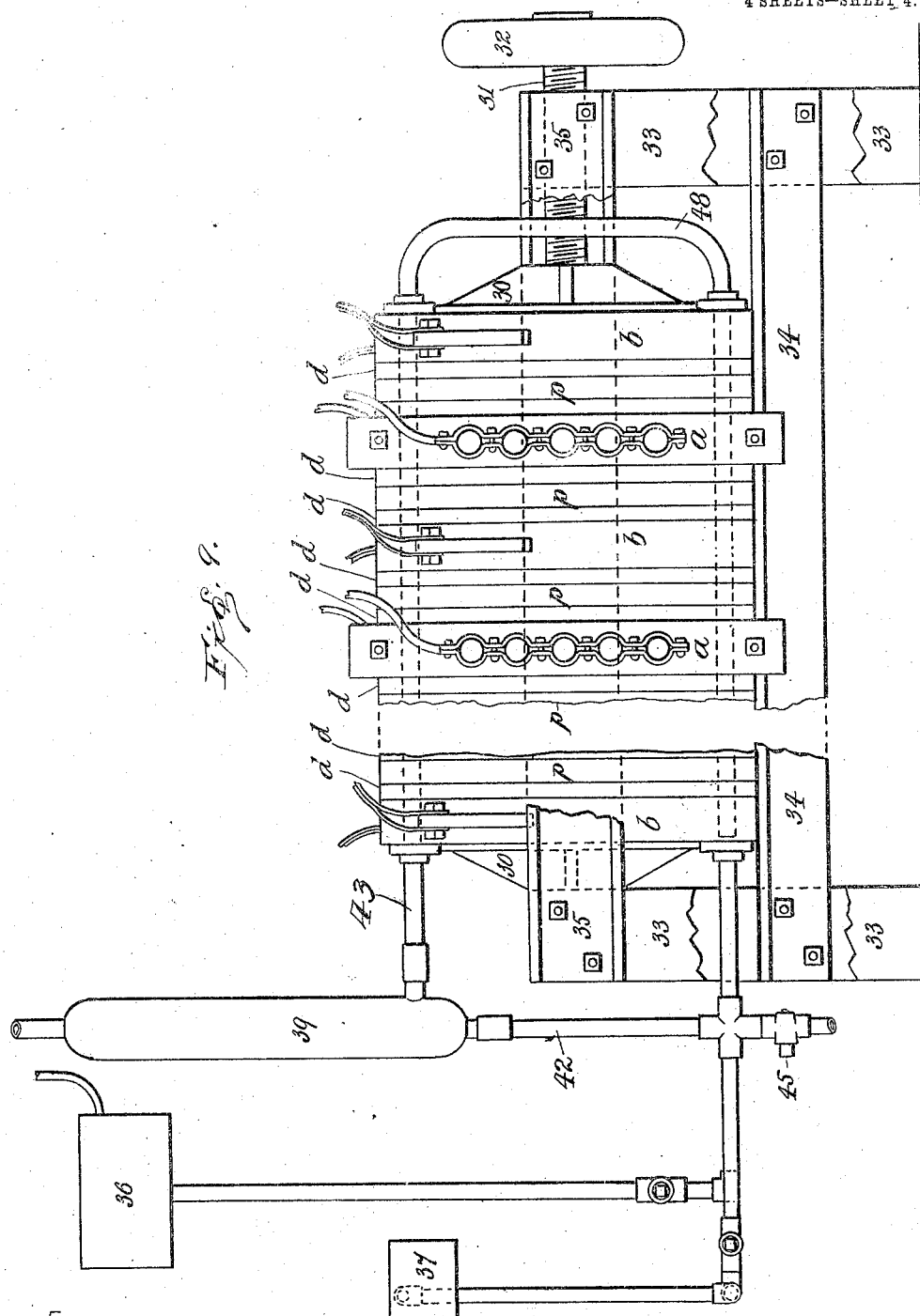
Witnesses—
Inventor
Robert Hugh Forsythe Finlay
By:
Attorneys

UNITED STATES PATENT OFFICE.

ROBERT H. F. FINLAY, OF BELFAST, IRELAND.

BATTERY OF ELECTROLYTIC CELLS.

No. 850,867.         Specification of Letters Patent.         Patented April 16, 1907.

Application filed February 12, 1907. Serial No. 357,036.

*To all whom it may concern:*

Be it known that I, ROBERT HUGH FORSYTHE FINLAY, a subject of the King of Great Britain and Ireland, residing at 54 Ulsterville avenue, Belfast, Ireland, have invented new and useful Improvements in or Connected with Batteries of Electrolytic Cells, of which the following is a specification.

My invention relates to improvements in or connected with batteries of electrolytic cells of filter-press form, by means of which certain advantages are obtained.

A cell forming part of a battery constructed under my invention embraces three chambers, hereinafter termed the "electrolyte-chamber," the "anode-chamber," and the "cathode-chamber," respectively, the electrolyte-chamber being situated between the anode-chamber and the cathode-chamber and separated from them by diaphragms. The electrolyte-chamber is supplied with electrolyte through a suitable inlet and preferably under regulated pressure. The electrolyte passes into the electrolyte-chamber, then through the diaphragms, and into the anode and cathode chambers, which are fitted with suitable outlets for the products of decomposition of the electrolyte. In practice I build up a number of such cells into a single battery, mounting them within a frame somewhat after the manner of an ordinary filter-press with tightening-gear to press the several cells together. When the cells are built up into a battery in this way, instead of providing each cell with a containing vessel or case I sometimes find it convenient to machine off the sides of the plates constituting the electrodes and the diaphragms at their outer edges and put in distance-pieces at these parts, so that the spaces within these distance-pieces and between diaphragms and electrodes shall constitute the chambers or parts thereof hereinbefore referred to. In a preferred form I make the anodes of a number of rods or other shaped pieces of carbon clamped or otherwise held by plates of wood or other insulating material and the cathodes of plates of iron, preferably provided with grooves, corrugations, or their equivalents.

Both sides of the electrodes may be used electrically, and suitable inlet and outlet passages are provided for dealing with the electrolyte and the electrolytic products.

I preferably keep the pressure in the electrolyte-chamber greater than that in the anode or cathode chambers.

In my battery I provide the plates, frames, and diaphragms with orifices which, together or with short tubes, constitute continuous tubes and by means of which liquids or gases may enter and leave the cells. The surfaces of such continuous tubes may be insulated or otherwise protected when desired. These tubes, with the pipes at the ends of the battery, constitute a complete circulating system. This complete circulating system embraces three tubular circuits, of which the end pipes form necessary parts.

I shall now proceed to describe the preferred form of my invention, and for the purposes of such description I shall assume that I am dealing with the brine of common salt. This form is illustrated in the accompanying drawings, of which—

Figure 1 is an elevation of a cast-iron cathode; Fig. 2, a section on line $x\,x$ of Fig. 1; Fig. 3, an anode; Fig. 4, an edge view of the same; Fig. 5, an elevation of a diaphragm; Figs. 6 and 7, non-porous distance-pieces; Fig. 8, an end view of a battery of cells; Fig. 9, a side view of the same; Fig. 10, a wrought-iron cathode, and Fig. 11 an edge view of the same.

I shall first describe the several parts of the battery constructed under my invention and thereafter its action when a solution of common salt is employed.

Referring to Figs. 1 and 2, 1 is a cathode of cast-iron having projections 2 cast thereon. These projections exist on both sides of the plate and are preferably, though not necessarily, staggered. 3 3 are shoulder-frames by means of which the cathodes are supported in a frame, as will be hereinafter described. 4 5 6 4' 5' 6' are orifices which when the battery is fitted up constitute tubes, as described herein. 7 7 are the leads for the electric current.

In Figs. 3 and 4, which illustrate an anode, 8 8 are the anode-carbons supported in orifices in the sides 9 of the anode-frame. This frame consists, preferably, of teak impregnated with paraffin and constructed with upper and lower bars 10 11, let into the sides 9, as shown, and the whole bound together by ties 12. 13 13 are the anode-leads, which are connected with the carbons in the following manner; 14 14 are strips of copper, which are bent round the ends of the carbons in the manner shown and connected by threaded bolts 15 between the carbons in such manner as to grasp the latter tightly and make good electrical connection. The ends of the conductors 13 are brought between the upper extremities of these copper strips and bound thereto by the threaded bolts 16, as shown. 17 18 19 17' 18' 19' are orifices constituting parts of the tubes hereinbefore referred to and hereinafter to be described.

In Fig. 5, which shows a diaphragm of any convenient material—such, for example, as asbestos-plate or asbestos fabric—the parts outside the dotted line 20 are impregnated with paraffin, so as to render them non-porous. The orifices 21 22 23 21' 22' 23' form parts of the tubes hereinbefore mentioned.

Fig. 6 is a distance-piece which when placed between two diaphragms combines with these diaphragms to embrace a space which constitutes the electrolyte-chamber 24. This distance-piece is also furnished with orifices 25 26 27 25' 26' 27', which, like the corresponding orifices in the cathode, anode, and diaphragm, constitute parts of the tubes of the circulating system.

Fig. 7 shows a non-porous distance-piece which, however, is only used when a flat anode or cathode is employed, so as to form the outer boundary of an anode or cathode chamber. Such distance-pieces are not employed when cathodes such as that shown in Figs. 1 and 2 or anodes such as that shown in Figs. 3 and 4 are employed.

Figure 8:
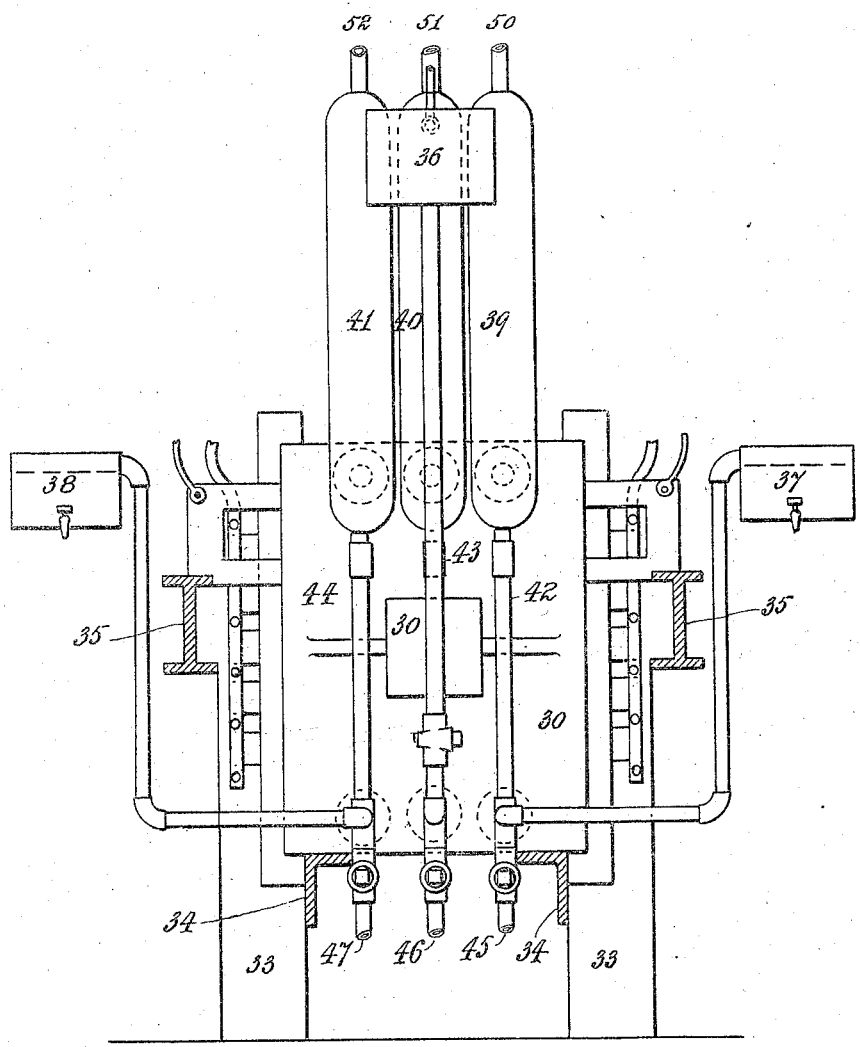

In Figs. 8 and 9, which are respectively an end elevation and a side elevation of a complete battery, $a$ $a$ are the anodes, $b$ $b$ are the cathodes, $d$ $d$ the diaphragms, and $p$ $p$ the distance-pieces, the latter serving to inclose the electrolyte-chambers. When these parts are arranged in the order shown in Fig. 9 and pressed together between the end plates 30 by means of the screw 31 and hand-wheel 32, the orifices 4 5 6 4' 5' 6' of the cathodes, those (21 22 23 21' 22' 23') of the diaphragms, those (25 26 27 25' 26' 27') of the distance-pieces, and those (17 18 19 17' 18' 19') of the anodes all coincide and form continuous tubes or ducts. The uprights 33 and girders 34 and 35 constitute a frame for supporting the several parts, and it will be seen that while the anodes rest upon the lower girders 34 the cathodes, by means of their brackets 3, rest upon the girders 35. The near girder 35 is shown as broken away in Fig. 9 except at the ends, so as not to interfere with the view of the other parts. The position of these girders 35 is, however, clear from Fig. 8. 36 is the feed-cistern for the brine, and 37 38 are respectively outflow-cisterns for the products from the cathode and anode chambers, respectively. 39 40 41 are separators, to be hereinafter referred to. From these separators the pipes 42 43 44 pass downward and have drain-cocks 45 46 47 at their lower extremities. These separators and pipes connect with the three double lines of holes in the elements making up the battery, so that three continuous tubular circuits are formed. Thus the tubular circuit from the feed-cistern 36 is by the series of central holes 5' of the first cathode, 22' of the first diaphragm, 26' of the first distance-piece, 22' of the second diaphragm, 18' of the first anode, 22' of the third diaphragm, and so on to the rear end (right-hand end of Fig. 9) of the battery, then upward by the middle one of the three parallel pipes 48 and back by the central holes 5 of the cathodes, 22 of the diaphragms, 26 of the distance-pieces, 18 of the anodes, and pipe 43 to the separator 40. Similarly, separator 39 and pipe 42 are in connection with the series of orifices 6' 23' 27' 19' 6 23 27 19 and outflow-cistern 37, while separator 41 is in connection with pipe 44, orifices 4' 21' 25' 17' 4 21 25 17, and outflow-cistern 38.

It will be seen from Fig. 6 that the electrolyte-chamber 24 opens into the orifices 26 26', from Figs. 1 and 2 that the interior of the cathode-chamber opens into the orifices 6 6', and from Figs. 3 and 4 that the interior of the anode-chamber opens into the orifices 17 17'. When, therefore, brine is fed from the feed-cistern 36 through the lower duct constituted by the central line of lower orifices, it rises from the orifices 26' into the electrolyte-chambers 24 and upward through the orifices 26 to separator 40. Owing, however, to the pressure due to the head of the brine in the feed-cistern, the brine is pressed from the electrolyte-chambers through the diaphragms, where it is electrolyzed in the anode and cathode chambers, respectively, in the usual manner. The products from the cathode-chamber pass into the orifices 6 and 6' to the separator 39 and outflow-cistern 37, while the products from the anode-chamber pass by the orifices 17 17' into separator 41 and outflow-cistern 38. Within the separators the liquids and gases are separated from one another, the gases subsequently passing upward through the pipes 50, 51, and 52 and the liquids again through the cells and into the outflow-cisterns or directly into said outflow-cisterns. Thus from the cathode-chambers hydrogen, caustic-soda solution, and undecomposed brine pass through the orifices 6 6' to the separator 39, the hydrogen passing off through tube 50 and the brine and caustic-soda solution passing partly back again to the cathode-chambers and partly into the outflow-cistern 37. Cistern 37 is emptied from time to time, and the mixture of brine and caustic-soda solution is afterward treated in any of the known ways, such treatment forming no part of my present invention. Similarly, the chlorin-gas liberated in the anode-chamber passes through the orifices 17 17' to the separator 41, where it leaves the brine and passes out by pipe 52, while a small quantity of the said chlorin with weakened-brine solution passes into the outflow-cistern 38, whence it can be drawn and be dealt with as may be desired. By means of a pipe passing from the brine-cistern 36 to another cistern or other source of supply regulated in any desired manner—as, for example, by means of a ball-cock—the head in the feed-cistern 36 may be maintained constant.

I have hereinbefore referred to the form of distance-piece shown in Fig. 7, which, however, is only used when I employ flat cathodes and anodes. In this case (as also in the distance-piece shown in Fig. 6) the solid part 55, surrounding the central open part 56, constitutes the outer walls of an electrode-chamber, the side walls being constituted by electrodes.

Figs. 10 and 11 show a flat wrought-iron cathode having orifices therein which, together with other orifices, as hereinbefore mentioned, serve to constitute tubes or ducts.

It will be seen that certain of the orifices—such, for example, as 4 and 4', Fig. 1, and 19 and 19', Fig. 3—have protecting-linings. These are for the purpose of protecting the material in which the orifices are made from the action of the fluids passing through them.

It will be seen from reference to Figs. 1 and 2 that the cathode is made of such shape as to constitute a cathode-chamber, in so far as the cavity-spaces surrounding the projections 2 2 are concerned, and the same may be said of the cavity-spaces surrounding the carbons 8 8 of the anodes constituting an anode-chamber.

I have hereinbefore referred to the tubular circuits, and these greatly enhance the efficiency of the cell, as they prevent the products of the electrical action from accumulating at any one point more than at another, and they insure a vigorous circulation being kept up through the pressure of the liberated gases.

Having thus described my invention, what I claim as new, and desire to secure by Letters Patent, is—

1. In an electrolytic cell, an anode comprising a frame, two series of carbons, one supported in each side of said frame, and copper bands connecting the outer ends of said carbons, substantially as set forth.

2. In an electrolytic cell, a cathode having projections on the opposite faces thereof, a laterally-extending rim around said cathode, the outer surfaces of said projections being arranged within the planes of the lateral faces of said rim, and diaphragms arranged against the lateral faces of said rim, the intermediate spaces between the diaphragms and the faces of the cathode constituting cathode-chambers.

3. In an electrolytic cell, a cathode having projections on the opposite faces thereof, the projections on one face being staggered with relation to those on the opposite face, a laterally-extending rim around said cathode, the outer surfaces of said projections being arranged within the planes of the lateral faces of said rim, and diaphragms arranged against the lateral faces of said rims, the intermediate spaces between the diaphragms and the faces of the cathode constituting cathode-chambers.

4. In an electrolytic cell, electrodes having rims with series of apertures in the upper and lower portions thereof and extending from one lateral face thereof to the other, the apertures in each electrode registering with the corresponding apertures in the other electrodes and constituting elements of circuits for the passage of the electrolyte and products of decomposition, and anode and cathode chambers formed between the planes of the opposite faces of the rims of each of said electrodes, said electrodes also having passages communicating with said electrode-chambers and with the circuits for the products of decomposition.

5. In an electroytic cell, electrodes having rims with series of apertures in the upper and lower portions thereof and extending from one lateral face thereof to the other, said electrodes having passages communicating with said apertures, anode and cathode chambers formed between the planes of the opposite faces of the rims of each of said electrodes, said apertures constituting elements of an electrolyte-circuit and of circuits to and from said electrode-chambers, a separator arranged in each of said circuits, an outflow-cistern connecting with each of the circuits to and from the electrode-chambers, and a pressure-supply source connecting with said electrolyte-circuit.

In witness whereof I have signed my name to this specification in the presence of two subscribing witnesses.

ROBERT H. F. FINLAY.

Witnesses:
 JAMES PERCY.
 HEYWOOD D. BUTLER.